(12) United States Patent
Patrovsky (10) Patent No.: US 6,582,598 B2
(45) Date of Patent: Jun. 24, 2003

(54) WAVE FILTER FOR ROTARY FILTER

(76) Inventor: Hubert Patrovsky, 580 Boul Industriel, St Eustache, QC (CA), J7R 5V3

( * ) Notice: Subject to any disclaimer, the term of this patent is extended or adjusted under 35 U.S.C. 154(b) by 134 days.

(21) Appl. No.: 09/735,915

(22) Filed: Dec. 14, 2000

(65) Prior Publication Data

US 2002/0074278 A1 Jun. 20, 2002

(51) Int. Cl.⁷ .................. B29C 47/68; B01D 29/96; B01D 35/12; B01D 33/15; B01D 33/37
(52) U.S. Cl. .............. 210/330; 210/359; 210/489; 210/493.1; 210/493.5; 210/498; 425/197; 425/199
(58) Field of Search .................. 210/330, 489, 210/493.1, 493.5, 498, 359; 425/197, 199

(56) References Cited

U.S. PATENT DOCUMENTS

| | | | |
|---|---|---|---|
| 2,382,656 A | * | 8/1945 | Obenshain |
| 2,539,129 A | * | 1/1951 | Gray |
| 3,817,377 A | | 6/1974 | Piggott |
| 4,019,987 A | * | 4/1977 | Krasnow |
| 3,145,746 A | | 8/1984 | Scher |
| 4,710,288 A | * | 12/1987 | Patrovsky |
| 5,407,586 A | * | 4/1995 | Gneuss |
| 5,988,397 A | * | 11/1999 | Adams et al. |

FOREIGN PATENT DOCUMENTS

| | | |
|---|---|---|
| DE | 1 554 913 | 6/1965 |
| DE | 24 03 765 | 6/1974 |
| EP | 0 114 651 | 6/1984 |
| EP | 0 144 941 A2 | 6/1984 |
| GB | 324398 * | 1/1930 |
| GB | 2044 118 A | 6/1965 |

OTHER PUBLICATIONS

Article in Kunstoff #GAK 3—1986 Johogang 39 p. 118.

* cited by examiner

Primary Examiner—Thomas M. Lithgow (57) ABSTRACT

Rotary filters, known within the polymer melt filtration industry, are improved by the provision of wave shaped filter support plates within the filter chambers of a rotatable disc of a filter. This rotatable disc filter has further a series of tabs, holddowns, or projections within this invention which further prevents the wave shaped filter media which conforms to the filter support from motion relative to the filter support and thus prevents damage to seals or the housing of the filter.

8 Claims, 9 Drawing Sheets fig. 1

WAVE FILTER FOR ROTARY FILTER

FIELD OF INVENTION

A rotary filter is provided with greatly expanded filter media area within the flow stream of material be filtered provided by a wave like grooved filter support plate which provided greater filter area within the size constraints of the corrugation and a similarly shaped filter media which has various holddowns.

BACKGROUND OF INVENTION

Rotary filtration started with a design of Werner & Pflieder in Germany. The basic concept continued in subsequent designs of Rehau and Gneuss, also German firms. Most recently Patt Filtration in Canada has further improved and produced equipment for rotary filtration.

A rotary filter is used to provide continuous filtration of materials with a constant pressure drop through the filter. It consists of a rotatable disc clamped between two blocks or side plates which have flow through channels in each. Flow is from an input block through the flow through channels which communicates between the input side, through a portion of an annular filter support and filter media containing area of the disc, and to and through an exit side flow channel to further processing equipment. The rotation of the disc brings new, non-contaminated filter media and the associated filter supports from the flow channels into the flow through area of the filter and filter support. At the same time, as the disc rotates, small amount of material is removed with the contaminated filter medis and filter support. Sealing is metal to metal making a properly constructed filter leak free.

The rotary filter, while an established technology, is poorly understood. A series of factors such as venting of filter channels, the hardening and the coatings needed to provide corrosion and antigalling protection, the forces used for clamping the parts together to form a seal, and the method to drive the rotary motion are all being changed as the knowledge of the system function improves. Since the filter is very expensive and involves extreme machining accuracy, methods to expand the filtration capacity of a given size filter is especially important. There has been little improvement in the filtration capacity of a disc of a given size since the early concepts were developed. Despite the lack of progress, there is a need to improve flow capacity of the filters.

A rotary filter has unique advantages for many applications. It is usually used for high viscosity materials and these are often at high temperatures. A typical use is to filter molten polymers at temperatures of 350 to 750 degrees fahrenheit and pressures of 2,000 to 12,000 pounds per square inch. The properly designed and produced rotary filter has essentially no leakage at the molten polymer conditions. It also provides essentially no pressure variation within the process stream as the filter media is changed to bring new filter media into the flow stream of material (such as molten polymers) needing filtration. It further resists high temperatures and pressures of flow streams being filtered. The downside of all of these advantages is that costly materials and machining methods are essential to the success of the rotary filter, making it an expensive filter.

While the rotary filter has many advantages, one big disadvantage is that the area for filtration is highly constrained. The filter media is placed in filter chambers machined within the rotating filter disc. The filter area (chamber area) can be, at its maximum, only a small sector of the annular ring formed within a filter disc. In numerical terms, in a few small filters the ratio of filter area in the flow stream being filtered to the total area of filter chambers on the disc may be as low as 1/25. In most lower pressure rotary filter applications the maximum of filter area in the flow stream to total filter area of filter chambers on the disc is 1/5. In the usual high viscosity filtration use, the filter construction is further constrained by the need for support of the filter media. Due to very high flow stream pressures substantial support plates, typically a thick plate with drilled flow through holes (in contrast to many cartridge filters which handle low pressures and have very thin supports or no supports) are needed. The balance of internal forces and the need to access the filter support to replace dirtied filter media usually restricts the surface area within the flow stream to no more than about 20% of the annular ring area. There is a need for higher flow area contact with filter media in rotary filters.

In a filter handling a viscous material, the filter media, which may have capacity of filtering particles ranging from tens of thousandths of an inch in diameter to microns in diameter and which may consist of several layers of filter media such as screen or sintered metal strip, has by far the greatest resistance to flow of the materials being filtered. In the most common applications of rotary filters, the filtrate is a molten polymer and the stainless mesh screen filter media has mesh of 400 to 20 mesh depending on the application. These screens are stacked together to remove contaminants.

The filter support and the chamber that hold the filter media are also potential problems. There is a desire to minimize the volume of the filter chamber so flow rates through each part of the chamber are sufficient to prevent time/temperature degradation of the filtrate (the fluid being filtered). This means that the depth of the filter chamber and especially its area are key design considerations. It is beneficial to minimize both depth and area of the filter chamber for flow reasons, however, the maximum area is beneficial to lowered total pressure drop and to increased filter capacity. In addition, the filter support, which is a plethora of small drilled holes, typically in the 2 mm to 5.5 mm diameter range, causes some resistance to flow. These small holes create a pressure drop that increases as hole diameter decreases and as hole depth and total flow increases. The depth of the holes in the filter support also is a function of the needed stiffness (which is a function of material and thickness) of the rotary filter disc. Looking at all of these factors, typical disc thicknesses are in the range of 20 to 50 mm with the required stiffness being a predominate controlling factor that keeps the disc thickness high despite the adverse pressure effects due to thickness. Greater thicknesses of the disc and the resulting improved stiffness and lowered distortion would mean either larger free area in the filter chamber and the resulting holdup of filtrate or higher pressures due to longer drilled hole lengths in the support plate. There is a need for a method to increase disc thickness without increasing free area (hangup) or pressure.

The steel used in production of the rotary filter disc is also an expensive high alloy specialty steel. The cost of the steel suggests that the rotary disc is kept to a minimum thickness, typically around an inch thick. First and foremost, the disc must be totally distortion free. Flatness of both sides and the parallelism of the two sides must be within microns. Increasing disc thickness increases disc cost but makes the disc more resistant to distortion.

The active filter areas within the rotary filter have been flat areas within the rotary disc. Specifically filter media chambers are machined into the filter disc and are separated by webs or lands that effect seals with the body plates surrounding the filter containing rotary disc. These filter chambers are shallow flat bottomed areas with the filter support and through holes in this flat bottom area. Filter media is placed into the chambers, resting on the flat surface of the bottom of the chambers and held into place by friction with the shallow walls of the chamber.

Flat filter supports and flat filter media has been used in all rotary filters to date because flat filter media is cut so that there is an effective slight interference with the filter chamber walls. This slight interference holds the filter media in place by interaction with the side walls of the filter chamber. Holding the filter media in place in this way insures that the filter media never rises higher than the depth of the filter chamber. The filter media is thus frictionally prevented form moving or falling into a position where the filter media can become wedged into the metal to metal seal between the rotary filter disc and the blocks that constrain the rotary disc. This is important because the tight metal to metal seals of a rotary filter can be destroyed if the filter media is caught between the filter disc and the side plate blocks that constrain the internal flow pressure of the fluid being filtered as the rotary disc moves. An improved method that provides a positive grip to restrain movement of filter media would be an improvement in rotary filtration.

DESCRIPTION OF THE INVENTION

A rotary filter where a disc containing filter supports and filter media within machined filter chambers is further improved by the provision of a wave like flow through bottom area of the filter chamber. This wave like area consists of a series of large grooves of waves that cut into the filter suport and greatly expand the area of each hole of the filter support in contact with a preformed filter media. This expanded area of hole in contact with the filter media creates a larger drainage area for each of the angle cut holes. At a 65 degree angle, the useful effective hole area within a filter chamber increases from the normal 50% of the surface area of the filter chamber to 140% of the effective surface area of an equivalent flat filter chamber. There is also a similar increase in the amount of filter media used per filter chamber. The filter media is shaped to fit into the wave form or grooves. To insure the filter media does not change position, a variety of holddown methods are described. A preferred example shows a set of end or wave top or wave bottom tabs which constrain the filter media from escaping outside the confines of the filter chamber. This is important since, when the disc is rotated through side plates that constrain and contain a fluid flow stream, a filter media that projects upward into the area between the side plate and the disc can cause severe damage to the metal metal seal constraining the fluid being filtered. The wave form or grooves also allow a thicker disc without causing flow or pressure problems.

This invention provides an increased flow area within the space constraints of the filter chambers of a conventional rotary filter.

The invention also provides increased capacity within a filter chamber and lowered pressure drop across the filter.

The invention further allows a thicker filtration disc without causing problems of pressure or flow.

The invention provides for a series of grooves or wave form corrugation of the bottom of the filter chamber and the provision of a formed filter media that conforms to the grooves or wave form corrugations and which has hold down tabs at the ends and/or along part of the edges of the filter media.

A rotary filter consists of an annular disc containing filter chambers which rotates around an axis, and as it rotates successively moves one or more of the filter chambers into a fluid flow stream. The disc is constrained by two side plates, aligned with each other, one in contact with a portion of each flat surface of the disc. Within these side plates is a fluid flow channel aligned such that the flow channel allows fluid communication from one side plate, through a portion of the rotary disc, and into the second side plate. The side plates are tightened by a series of bolts at the center of the annular disc rotation and by bolts arrayed outside the largest diameter of the rotary filter disc. These bolts apply a tightening force squeezing the rotary filter disc between the two side plates which forms a metal to metal seal between each side; plate and one side of the rotary disc. When the side plate and the disc surfaces which are in rotary contact are nearly perfectly flat and have hardness and coatings that prevent galling or other effects that prevent rotation of the rotary filter disc, the disc may be rotated freely. The disc center of rotation is remote from the fluid flow channel within the side plates and there is an annular filter zone of the disc created by the fluid flow channel as the rotary disc rotates around its axis of rotation.

A series of filter chambers are located upon the rotary disc. The chambers are in the annular filter zone of the rotary disc. Each filter chamber is cut into the surface of the disc and each filter chamber is separated by a web of the rotary disc surface from adjacent filter chambers. Each web runs in a roughly radial direction from the center of the annulus. The shape of the web typically accommodates a portion of the flow channel shape. The filter chambers are arrayed around the disc in an annular zone.

A rotary filter as is currently produced has a relatively thin disc. This disc contains a series of filter chambers arrayed within an annular area such that the rotation of the disc brings each filter chamber through the loci of a flow stream which is contained between a pair of side plates which surround the rotary disc, each on one flat surface, and which form a metal to metal seal with the disc. Each of the filter chambers is separated from the next chamber by a web which is part of the disc surface and thus forms seals with the side plates.

In prior practice, filter chambers were shallow cavities which typically had flat bottom surfaces. These bottom surfaces had through holes that extend from the bottom through the disc to the other surface to allow for through flow of the filtrate. A set of wire screens or other similar filter media sits on the flat filter bottom and is held in place by frictional forces of the filter media against the walls of the shallow chamber. In the present invention the filter holes have a similar total flow resistance but are modified by machining a thicker disc at the bottom of the filter chamber with a series of grooves or waves such that the holes are both longer and shorter than in the flat bottom filter chamber case. The hole lengths are thus modified by provision of the wave or grooved bottom in the thicker disc. The machining of the waves or grooves make the thickness of the filter support thinner in areas which effects pressure drop through the holes and the flow. This provides for maximum flow through the shortest holes which are near the bottom of the grooves or waves (the holes with the least resistance to flow). The lowest flow is through the longest holes. The flow thus is maintained through each of the grooves and there are no static areas without flow. The total mass flow through the filter chamber can be the same but the extra filter area now possible also permits higher flow at the same pressure drop.

The importance of the wave or grooved filter support is best seen by consideration of the flow of a very fluid material like water through filters. A filter media such as the often used woven screens allows low viscosity (easy flowing) fluid to flow directly through the screen in the area of holes in the support media plus flow under the screen in areas adjacent to the hole. The net effect of screen filter media filtering water is thus a totally available effective screen area. As viscosity increases two factors enter into the fluid flow area consideration. First the filter media or screens must resist a significant pressure caused by the fluid resistance to flowing through the fine filter media mesh. Second, the filter support must be rigid enough to not deform under the force of the fluid passing through the filter media and the filter support itself, thus the hole spacing must allow sufficient steel for rigidity. The net effect of filtration of very viscous materials thus is that considerable mass of the filter support is needed making through hole size smaller and the thickness of the support greater. With small closely packed holes, the total surface of the filter media effectively defines the real effective filter area. The present invention largely conquers this problem by maintaining the total cross sectional flow passage area on the disc constant while increasing the effective entry area of each hole, since each hole is now cut on a diagonal. The cutting of each hole at a sharp angle to the axis of the hole makes the free area in contact with the back of the filter media (the side of exiting flow) greater as the holes go from circular to elliptical, and thus providing the equivalent of a much larger hole. The total amount of the rotatable disc in contact with the flow stream remains constant but as the waves increase in angle and in number, the effective area of the filter as compared to the flat area greatly increases. In normal plastic filtration applications, the area of free holes is approximately 50% of the total disc area. When the disc is formed into waves or grooves at a 45 degree angle the holes that are parallel to the axis of the disc are now cut into an elliptical shape that increases the area of the holes to cavity area to 70% of the cavity area. As the angle of slope of the waves or grooves increases to 65 degrees, the area of the (now very elliptical) holes to the area of the flat cavity on the disc increases to 140% of the flat cavity area, thus providing more effective hole area than if there was no filter support. Filter media follows the same total area formula so the total area of filter can increase by up to 140% of a normal flat filter area when design extremes are used.

The net effect of the invention is to allow a relatively small rotatable filter within a rotary filtration device to act as a much larger size, thus allowing cost effectiveness and even more important allowing the rotary filter metal to metal seals to work in flow conditions where they were previously impractable due to the increased filter areas provided by wave bottom filter supports and filter media.

It is worth while to examine the factors that make the wave bottom filter possible. The drilling of closely spaced holes through a sharply angled surface will cause the drill to deflect as it enters or exits on the angled surface. If the holes are deep (ie they have a large length to diameter ratio expressed as L/D) the normal use of end mills or of drill collars will not prevent this distortion. As a result holes have to be drilled in a thick support plate with parallel surfaces, then shaped into a wave form. If the desired final shape of the hole containing filter support is a rectangular plate there would be no problem in fabrication of waves by milling the grooves into the rectangular plate. The optimum configuration of a rotary filter support plate is a shape that conforms to the inflow edge of the flow channel which defines a series of roughly kidney shaped filter chambers separated by a web spacer portion of the disc. In such a configuration, the shape could not be machined directly into a rotary disc without considerable entry and exit areas lost to flow and without distortion of the narrow shape of the web separating the filter chambers.

One solution to machining a filter support that allows the web to be maintained in the needed narrow strip shaped to the inflow edge of the flow chamber is to make the filter supports removable. The advent of electrodeposition machining methods allows a number of precisely shaped pockets for filter supports to be machined with angled walls holding a similarly angled filter support in place. Such a precision machined pocket and the filter support that fits into this pocket are firmly held by the matching angled sides of the parts such that the filter support does not protrude in a manner that would interfere with rotation of the disc containing the filter support from the rear of the disc. At the down flow side of the filter, away from the filter media, the angles diverge towards the filter media side so a light tap or pressure allows the removable support plate to be ejected from the filter disc. Even when the angles are the same the filter support plate is easily removable. The precision cut filter supports are totally interchangeable so each removed support can be easily replaced with new or cleaned filter support and filter media.

This removable filter support technique and the Electrodischarge machining methods that enable it also allow the manufacture of a wave filter. By use of removable filter and the EDM cutting of a support plate predrilled with holes first into a series of wave shapes across the filter support plate then taking the wave form containing filter support and cutting the angled edges of the filter chamber shape is possible. A wave filter can be effectively manufactured.

The wave in itself is a major advance but it is one that has problems. The corrugated shape of the filter media set on top of the filter support is such that thermal expansion differences, pressure backup or material backup from the downside (filtered or filtrate side) of the filter can easily cause a bow in the already corrugated filter media and allow the filter media to project away from the filter support and place the filter media in a position that allows it to be mangled between the side plate and the rotating disc such that the sealing surface of the filter is damaged. The rehology of the polymers filtered and the spring like shape of the waved filter media as well as the common use of stiff filter medias such as metal screens makes this a major problem. In filters made of cloth or relatively limp fibers this would not be a problem. The filter media does not cause a problem in many pleated support uses because these are used for fluid (low viscosity & high flow) materials as opposed to the stiff hard materials used in polymer filtration. It turns out that a holddown mechanism preventing motion of the filter media is needed to allow a wave shape filter to rotate under actual operation conditions of high viscosity, low flow filtration. It is the series of holddown methods and mechanisms that enable success with a wave type filter.

In this invention a variety of specific holddown methods are shown but the basic concept remains a wave shape filter support which has a method or means of preventing the upward motion of the filter media into the space of the filter chamber where the filter media may interact adversely with critical sealing surfaces or prevent rotary motion. The specific methods of preventing this motion are tabs located at various places, rod retainers and other holddown rings or projections. While specific configurations are discussed and revealed as embodiments, the words used herein should not be construed in a broader context than the text permits and all holddowns are part of a technology that permits the use of waves or corrugations in a filter for polymers and similar viscous materials. The concept is especially valid for rotary filters since the rotary filter is essentially unique in its use of metal to metal rotating seals.

DESCRIPTION OF DRAWINGS

In FIGS. 5 through 9, a series of screen shapes with different holddown tabs are shown prior to forming to make the filter media conform to the corrugations.

PREFERRED EMBODIMENT

Figure 1:
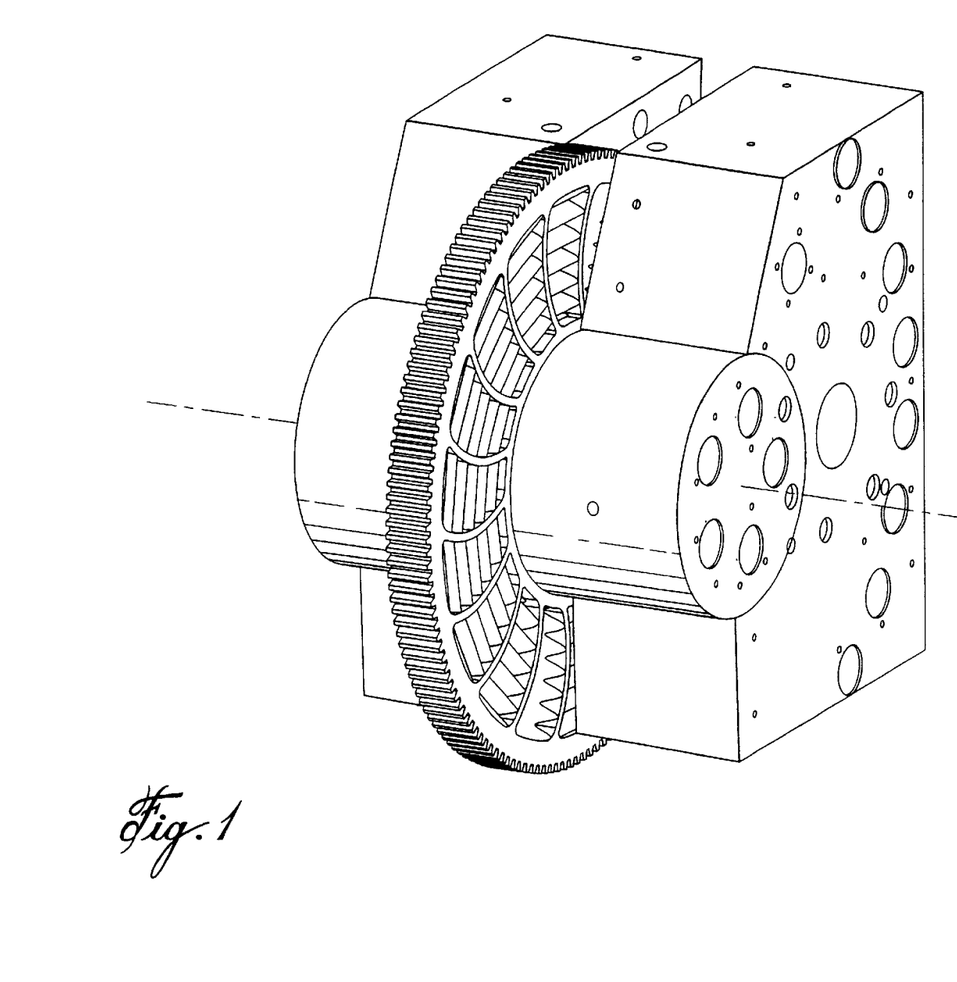
In FIG. 1, a typical rotary disc filter is shown, assembled. The disc is shown projecting from side plates and filters chambers are shown on the disc.
Figure 2:
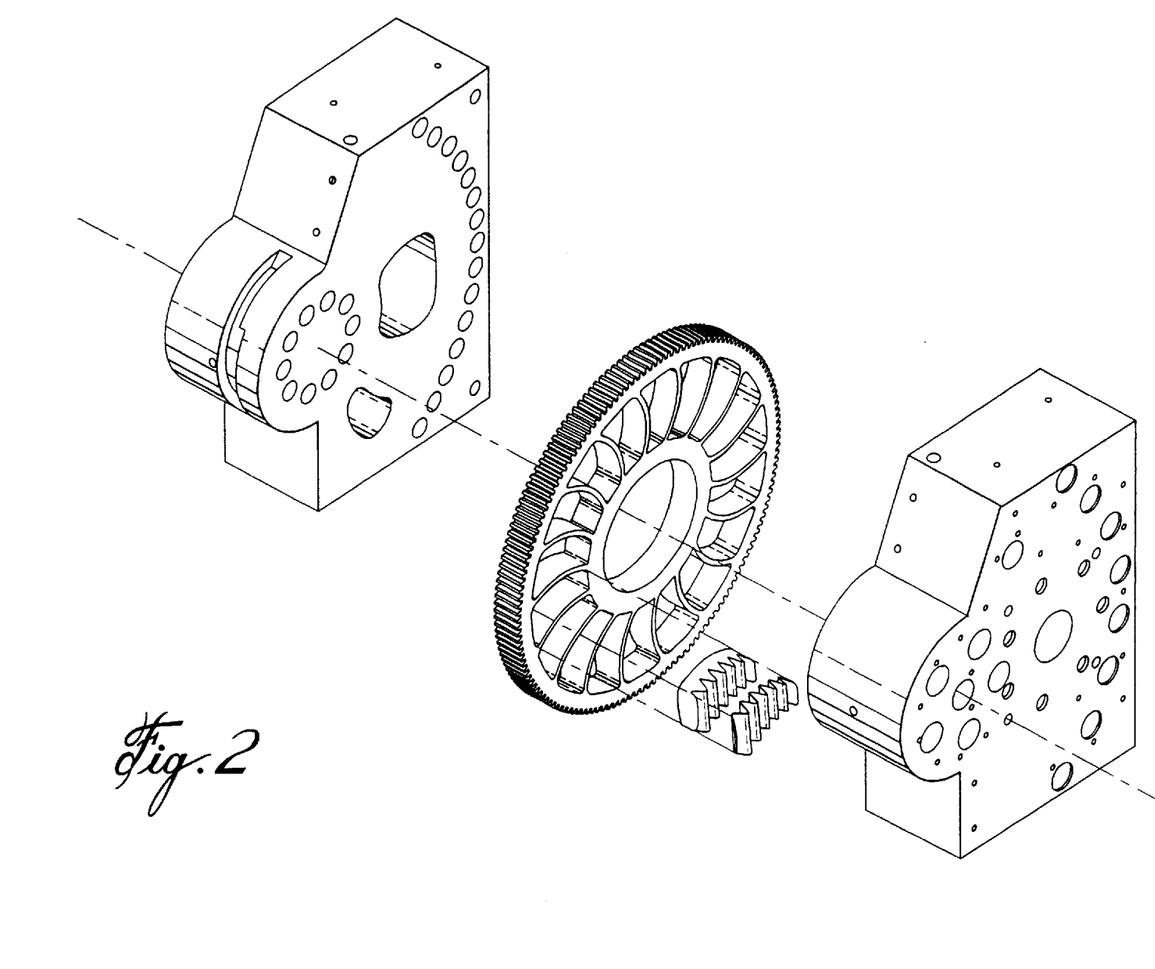
In FIG. 2, the typical rotary disc filter is shown in a disassembled condition with key parts marked.
Figure 3A:
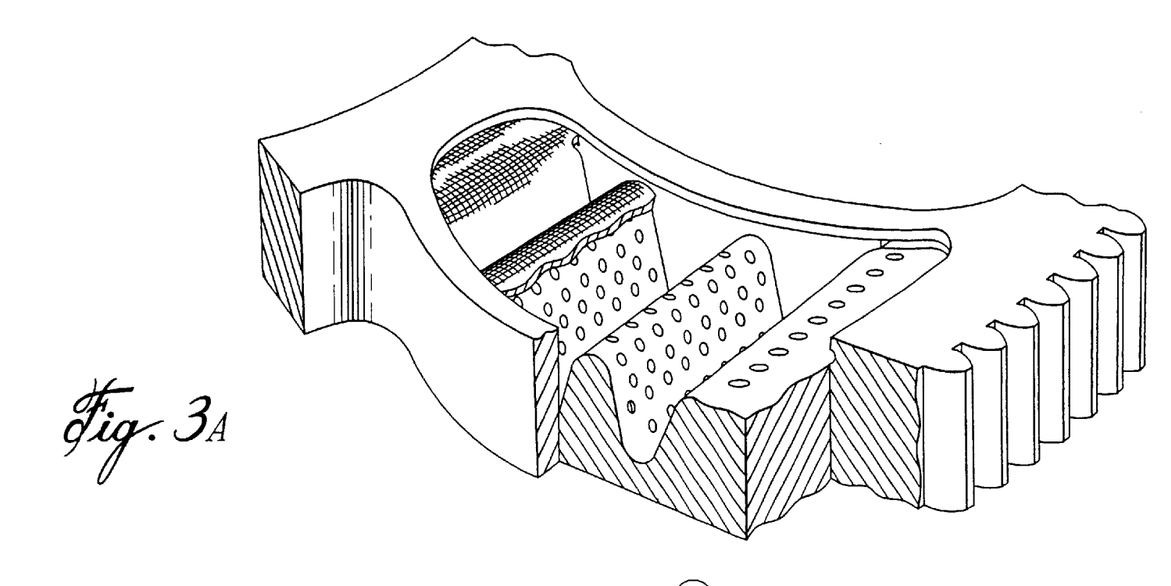
In FIG. 3, a view of a corrugated rotary disc is shown with the screen covering cut away to show the filter support and where end tabs are used to hold the filter media in place.
Figure 3B:
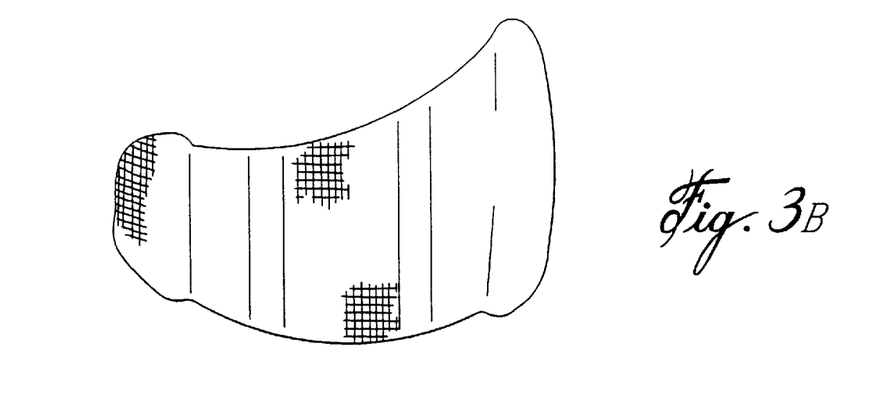
Figure 4A:
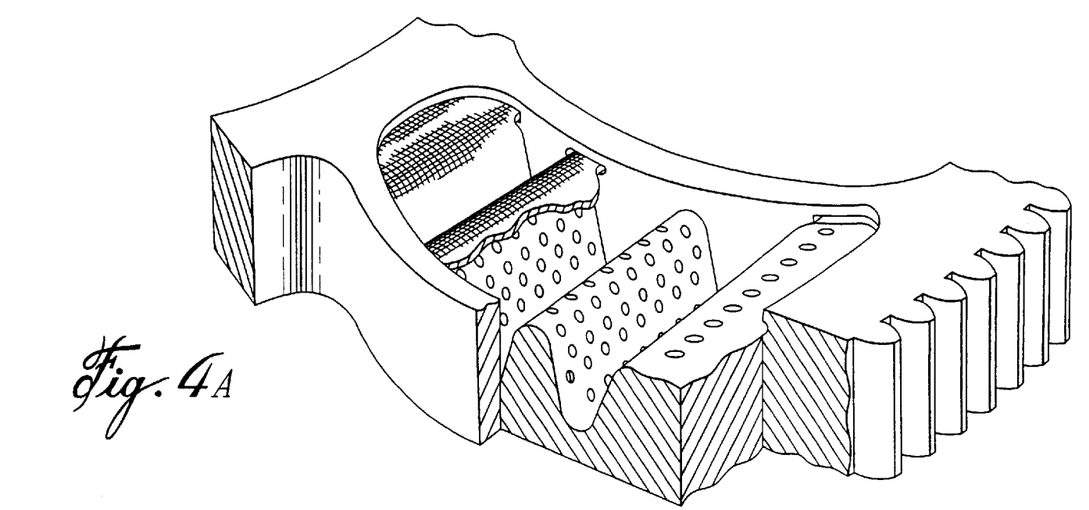
In FIG. 4 the corrugated rotary filter support is shown with part of the filter media cut away and a system of tabs at the tops of the corrugations holding the filter media in place.
Figure 4B:
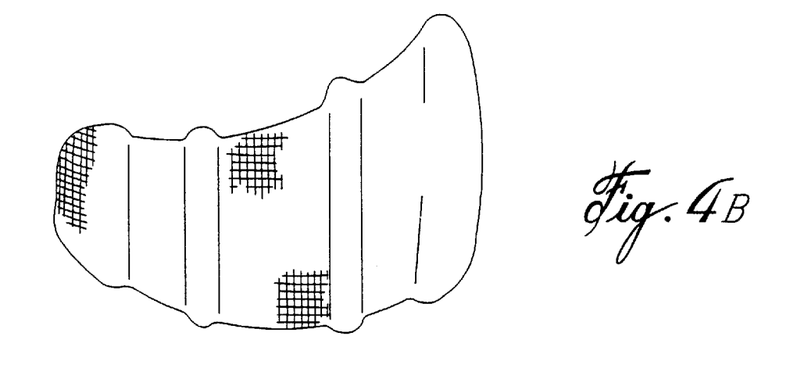
Figure 5:
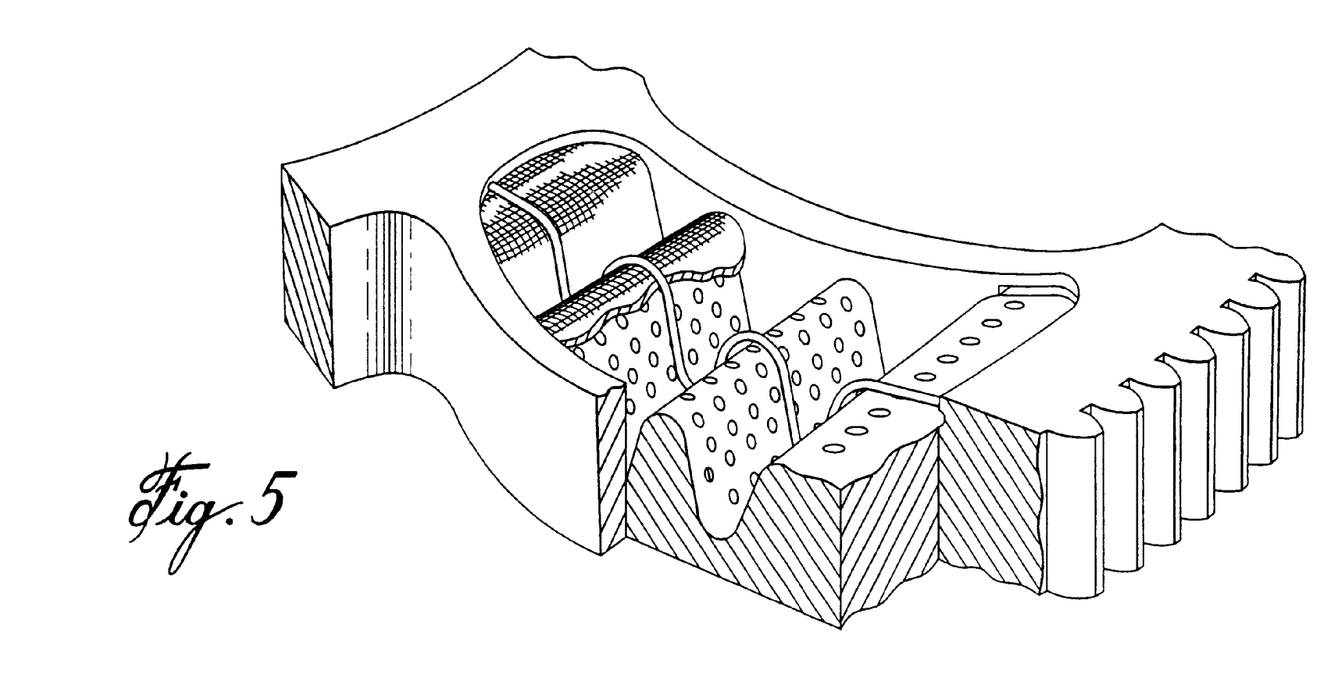
FIG. 5 shows use of a restraining holddown element.
Figures 6A, 6B:
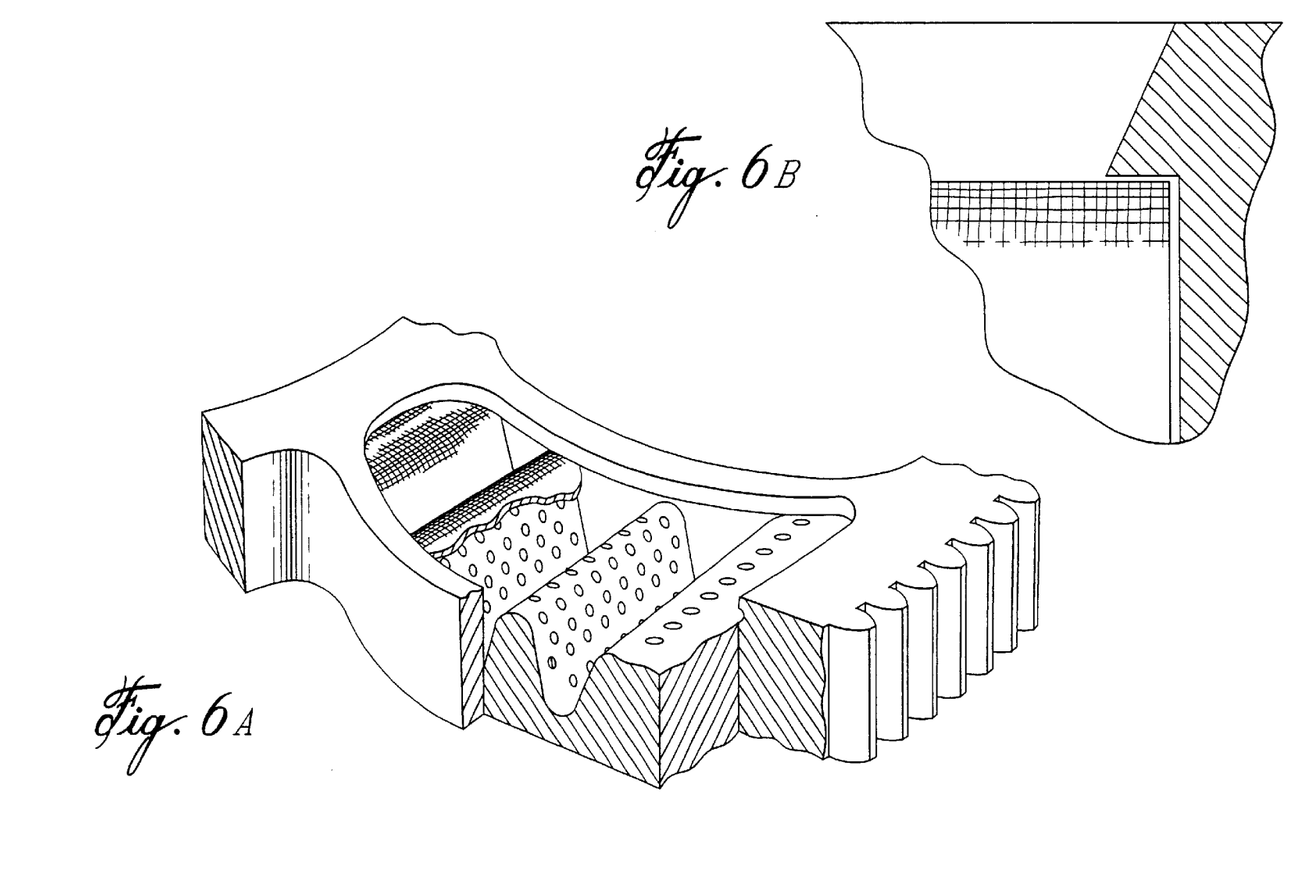
FIG. 6 shows a projecting tab around all of the filter chamber to prevent motion of the filter media.
Figure 7:
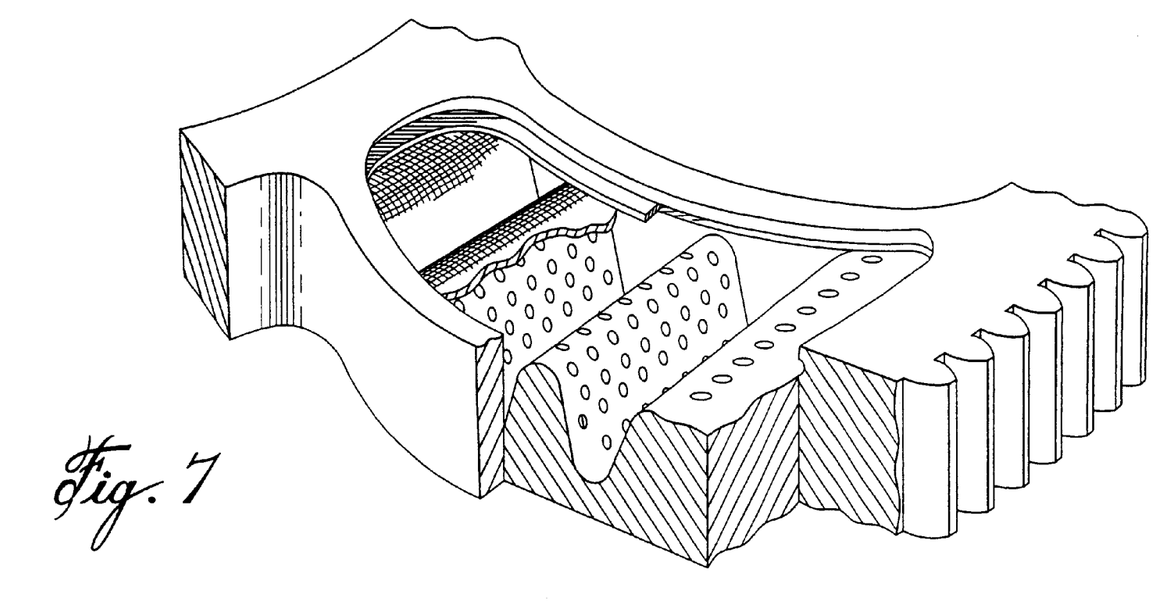
FIG. 7 shows a retaining ring that acts within a groove instead of the projecting tab in FIG. 6.
Figure 8:
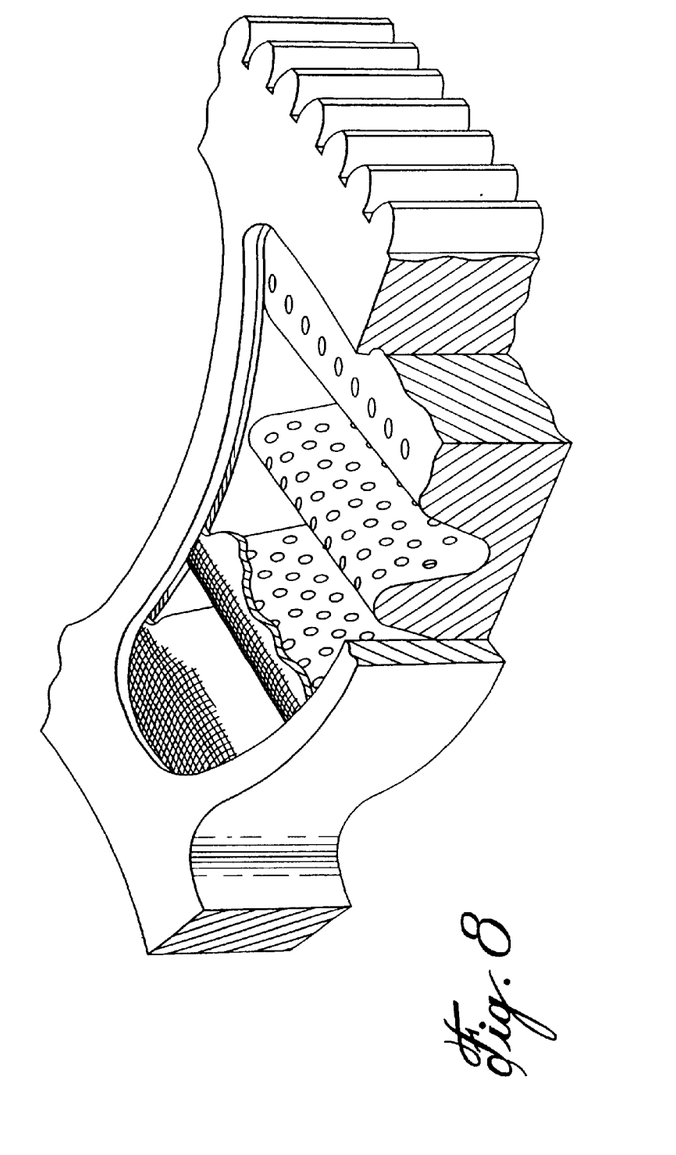
FIG. 8 shows partial projections in critical locations restraining the filter media.
Figure 9:
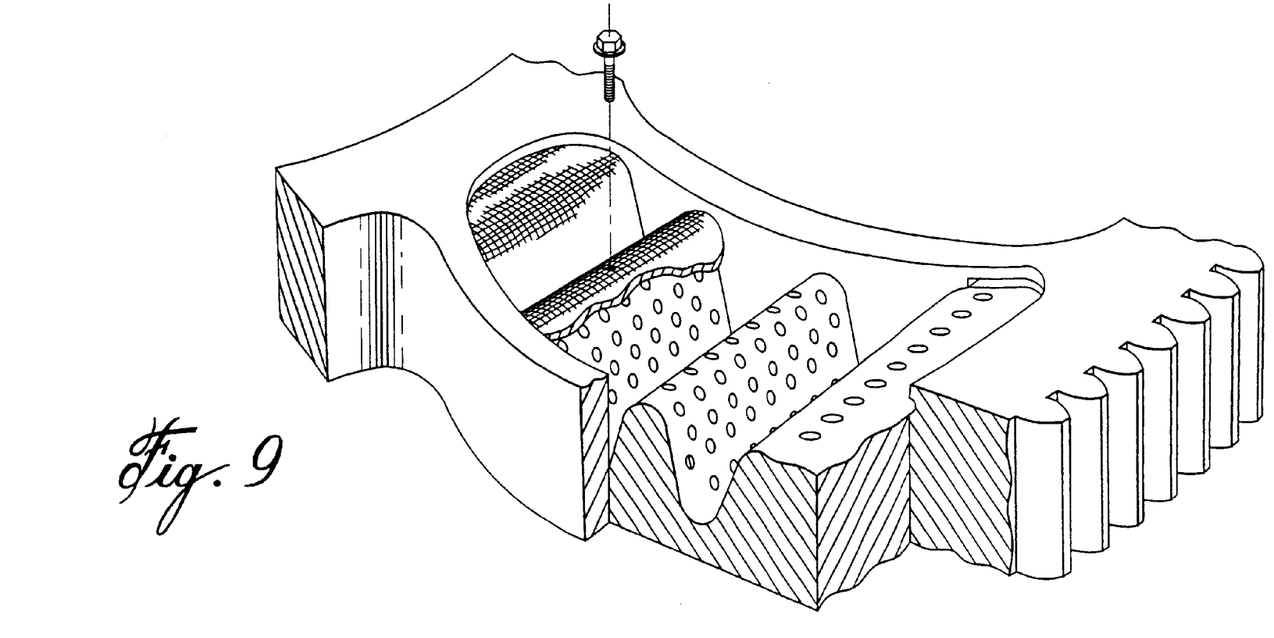
FIG. 9 shows a screw down screen holder.

In the most preferred embodiment a rotary screen changer of "D" size was modified according to the invention. The rotary disc which is normally 35 mm thick and 495 mm in diameter is modified by making it 17 mm thicker bringing total thickness to 52 mm. The filter chamber on the disc area 140 mm by 90 mm remains unchanged and the same 200 holes, each with a diameter of 4.8 mm is provided in the bottom of the filter chamber.

The disc filter chambers are machined in an annular zone of a ground disc which has parallel inlet side and outlet side surfaces. The disc has very close tolerances providing flat surfaces parallel to each other. Holes that communicate from one surface to the other are then drilled into the disc forming typically 18 areas, each drilled with a pattern of 200 closely spaced holes of 4.8 mm diameter. The shape of the filter chamber is then machined into the disc, each separate filter chamber in one hole cluster area. Unlike the normal flat bottom disc, a series of five waves are machined into the surface of the disc starting at a point 7 mm below the disc inflow surface and extending from a 3.8 mm top and bottom radius at 76 degree angle to the flat disc surface to within 25 mm of the outflow surface. These waves, spaced approximately 20 mm apart intersect the drilled holes at the 76 degree angle making them appear elliptical on the machined surface. Holddown grooves are located near the top (inflow sides) of the waves and/or end grooves are provided for fastening filter media. These 4.5 mm deep by 0.5 mm wide grooves are then machined in the filter chamber.

The same machining steps are done with each of the 18 filter chambers in the annular filter zone of the filter disc.

When the filter chambers are completed the disc is finish ground to high flatness, heat treated, ground and polished, coated, and again polished prior to use in the rotary filter.

The filter media is formed to accommodate the wave form of the rotary filter filter chamber bottom by placing an appropriately sized woven wire screen in a press shaped similar to the bottom of the filter chamber. The woven wire filter media will typically be formed into screen packs which usually consist of a series of woven screens, often of a dutch weave or other weave adapted for effective filtration which are increasingly fine mesh size counting from the inlet side to the outlet side and then one or more final coarse support screens. One common configuration is a 40 mesh dutch weave screen, a 100 mesh dutch weave screen, a 200 mesh square weave screen and a final 100 mesh coarse screen. The screens may be spot welded to prevent separation but this is not essential. In the preferred embodiment, an area of 20 mm from each end is made 1.5 mm larger that the filter chamber dimension to allow it to engage with a groove machined into each end of the filter chamber. The assembled screen pack is pressed with a mechanical or hydraullic press and cut to shape. The press will be shaped exactly in the same wave pattern as the filter chamber bottom so the finished parts will closely conform to the wave pattern and the filter media will fit on the surface of the wave pattern.

The disc as machined, ground, polished, heat treated and coated is then used as the filter containing rotary filtration disc in a rotary filter.

In a second embodiment of the invention, the disc is machined as in the most preferred embodiment and the addition of the 1.5 mm tabs at the end of the filter media and the corresponding groove is eliminated and the filter media is cut to fit the wave bottom filter chamber and formed and frictional effects with the walls of the filter chamber is used to hold the filter media in place.

In a third embodiment of the invention, the disc is machined as in the most preferred embodiment and the addition of, tabs that project approximately 1.5 mm are located at the top or inlet side of each filter media such that these tabs project from the tops of each wave and there interact with grooves located 4 mm below the top of the inlet surface and 0.4 mm wide. The tabs allow the ends of the filter media slight movement but constrain the filter media from free motion.

In a fourth embodiment of the invention, the disc is machined as in the most preferred embodiment and the addition of a groove 0.4 mm wide and 2 mm deep completely around the inner walls of the filter chamber 4.0 mm below the disc surface which accommodates a spring steel snap ring that is placed after the filter media is installed and which holds it in place.

In a fifth embodiment of the invention, the disc is machined as in the most preferred embodiment and the addition of a hold down bar interacting with grooves at the ends of the filter chambers, the hold down bar being wire, a flat band or similar motion restraining device that conforms to the shape of the waves on top of the filter media or that goes across the filter chamber and contacts and applies downward force to the filter media at the top of each wave shape.

In a sixth embodiment of the invention, the disc is machined as in the most preferred embodiment and the addition of 0.5 mm projection located within 4 mm of the top of the filter disc, said projection acting to hold the edges of the filter media.

In a seventh embodiment of the invention, the disc is machined as in the most preferred embodiment and the addition of separate and discrete 0.5 mm projections that are 2 mm in width (along the perimeter of the filter chamber adjacent and 1 mm above either the tops or bottoms of the wave shapes, said projection acting to hold the edges of the filter media.

In an eighth embodiment of the invention, the disc is machined as in the most preferred embodiment and the addition of separate and discrete taped holes and a bolt with a head no thicker than 2 mm used at the top of one or more of the wave shapes and which passes through the filter media and is threaded into the disc.

I claim:

1. A rotary screen changer which has a rotary filter disc with an inflow side and an outflow side, and having an annular area which contains a series of filter chambers, each said filter chamber is comprised of a machined area in the fluid inflow side surface of said rotary filter disc, side walls of said filter chamber formed by webs, each said web separating adjacent filter chambers, and with a bottom of the filter chamber which has a plurality of holes from said chamber bottom through to the opposite disc surface and where the bottom of said chamber is further machined such that a series of waves are formed in the bottom of said chamber, and where a filter media, shaped in a configuration of said waved bottom of said filter chamber is placed into said filter chamber, and where fluid flows form said inflow side of said filter chamber, into said chamber, through said filter media, and through said waved bottom of said filter chamber, through said holes in the bottom of said filter chamber and out to the other surface of said rotary filter disc, said fluid in fluid communication from the inflow side of said disc to the outflow side of said disc.

2. The rotary filter in 1 where said shaped filter media has additional holddown elements.

3. The rotary filter in 1 where said filter chamber has said side walls modified to provide holding forces upon said shaped filter media.

4. The claim in 2 where said holddown elements are tabs located at the ends of said shaped filter media which engage grooves or projections in the wall of said filter chamber.

5. The claim in 2 where said holddown elements are tabs located at the top or bottom of the wave shape which interact with grooves in said walls of said filter chamber.

6. The claim in 3 where said holding forces are provided by projections form the wall of said filter chamber which engage said filter media and prevent motion.

7. The claim in 3 where said holding forces are provided by rings placed within grooves on said inflow said of said filter media.

8. The claim in 3 where said holding forces are provided by a member placed on the inflow side of said shaped filter media which interacts with grooves or projections in said side walls of said filter chamber.

* * * * *